United States Patent
Baker et al.

(10) Patent No.: US 10,071,672 B2
(45) Date of Patent: Sep. 11, 2018

(54) METHOD AND CIRCUIT ARRANGEMENT FOR FEEDING A SERIES CIRCUIT OF N LED UNITS

(71) Applicant: ZKW Group GmbH, Wieselburg (AT)

(72) Inventors: Julian Baker, Loosdorf (AT); Martin Biesenberger, Persenbeug (AT); Stefan Miedler, Unterradlberg (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 15/512,111

(22) PCT Filed: Aug. 11, 2015

(86) PCT No.: PCT/AT2015/050195
§ 371 (c)(1),
(2) Date: Mar. 17, 2017

(87) PCT Pub. No.: WO2016/044869
PCT Pub. Date: Mar. 31, 2016

(65) Prior Publication Data
US 2017/0282782 A1    Oct. 5, 2017

(30) Foreign Application Priority Data

Sep. 22, 2014 (AT) .............................. A 50671/2014

(51) Int. Cl.
*B60Q 1/04* (2006.01)
*H05B 33/08* (2006.01)

(52) U.S. Cl.
CPC ........... *B60Q 1/0408* (2013.01); *H05B 33/08* (2013.01)

(58) Field of Classification Search
CPC .................................................. B60Q 1/0408
See application file for complete search history.

(56) References Cited

U.S. PATENT DOCUMENTS 7,781,979 B2 *  8/2010  Lys ..................... H05B 33/0857
                                                    315/185 S
8,994,287 B2 *  3/2015  Ito ............................ B60Q 1/00
                                                    315/185 R
(Continued)

FOREIGN PATENT DOCUMENTS

DE      102006024607 A1      11/2007
DE      102007006438 A1       8/2008
(Continued)

OTHER PUBLICATIONS

International Search Report and Written Opinion for PCT/AT2015/050195, dated Jan. 4, 2016.
(Continued)

*Primary Examiner* — Jeffrey Zweizig
(74) *Attorney, Agent, or Firm* — Eversheds Sutherland (US) LLP

(57) ABSTRACT

A method and a circuit arrangement for feeding n LED units (LED1 to LED5) of a lighting unit of a motor vehicle by way of a controlled power source (5) from a voltage source (2) having a fluctuating operating voltage ($U_B$), in which the LED units (LED1 to LED5) are interconnected, and in particular k LED units (LED1 to LED5) of a series connection are short-circuited, when the operating voltage ($U_B$) drops, taking a stored weighting with respect to the priority assigned to individual LED units into consideration, wherein current continues to flow simultaneously through (n−k) LED units. A memory unit (7) for storing information about weightings on the priority of certain LED units is assigned to the control unit (3) for activating the power source, a switching matrix (4', $S_1$ to $S_4$), and in particular a circuit arrangement composed of n controlled switches ($S_1$ to $S_4$) that each bypass the LED units (LED1 to LED4, LED5) is provided, and the control unit (3) is configured to compared the operating voltage and/or the current ($I_S$) of the power (Continued)

source to predefinable threshold values and to interconnect the LED units as a function of this comparison and the weighting.

15 Claims, 5 Drawing Sheets

(56) References Cited

U.S. PATENT DOCUMENTS

| | | |
|---|---|---|
| 2003/0164809 A1 | 9/2003 | Leung |
| 2008/0122376 A1 | 5/2008 | Lys |
| 2013/0002141 A1 | 1/2013 | Lee |
| 2013/0241423 A1 | 9/2013 | Chu |
| 2014/0217909 A1 | 8/2014 | Chu et al. |

FOREIGN PATENT DOCUMENTS

| | | |
|---|---|---|
| DE | 102008025397 A1 | 12/2009 |
| EP | 2490507 A1 | 8/2012 |
| WO | 2009/144024 A1 | 12/2009 |
| WO | 2010/013177 A1 | 2/2010 |

OTHER PUBLICATIONS

Office Action issued in Austrian application No. A 50671/2014, dated Jul. 8, 2015.

* cited by examiner

METHOD AND CIRCUIT ARRANGEMENT FOR FEEDING A SERIES CIRCUIT OF N LED UNITS

The invention relates to a method for feeding n LED units of at least one lighting unit of a motor vehicle by way of a controlled power source from a voltage source having a fluctuating operating voltage, in which individual LED units are connected in series and/or connected in parallel and/or bypassed, depending on the level of the operating voltage.

The invention furthermore relates to a circuit arrangement for feeding n LED units by way of a controlled power source from a voltage source having a fluctuating operating voltage ($U_B$), and comprising a control unit for activating the power source and a switching matrix that is assigned to the LED units and includes controlled switches, wherein the control unit is configured to connect individual LED units in series and/or in parallel and/or to bypass these, depending on the level of the operating voltage.

An LED unit within the scope of the invention shall be understood to mean both an individual light-emitting diode (LED) and a unit that is composed of multiple LEDs connected in parallel and/or in series.

A switching matrix is described in WO 2010/013177A1, for example, to which LED groups or individual LEDs are assigned and which is connected to a voltage source and to a controllable power source. Furthermore, a control unit is provided, which is able to activate the individual switches of the switching matrix and the power source, and which is configured to compare the voltage of the voltage source to voltage thresholds stored in a memory. So as to ensure satisfactory feeding of the LEDs even with heavy fluctuations of the voltage source, the control unit is configured to connect all or some of the LEDs in series or in parallel depending on the level of the voltage detected at the voltage source, wherein de facto all conceivable combinations of series/parallel connections are possible. The described solution requires three controlled switches for each LED, and an accordingly complex activation logic circuit; above all, however, there is the disadvantage that no uniform brightness of the LEDs used is ensured if operating voltage fluctuations occur, and rather one or more LEDs even remain dark.

It is an object of the invention to create a method and a circuit arrangement for feeding a series connection of n LED units for use in motor vehicles, in which a driving operation is enabled which, despite fluctuations in the operating voltage that would normally result in failure of the corresponding lighting module, still ensures the necessary traffic safety, or impairs the appearance of the entire LED system as little as possible, even if heavy voltage fluctuations occur.

This object is achieved by a method of the type mentioned above, in which according to the invention the LED units are interconnected by considering a stored weighting with respect to the priority assigned to individual LED units when the operating voltage drops.

As a result of the prioritization predefined in a memory, not all or arbitrary LED units fail in the event of a drastic drop in voltage. Rather, LED units that are paramount for safety are kept active, while others, perhaps less important ones, are shut down.

In one variant that is easy to design, it is provided that a series connection of n LED units is fed, wherein individual LED units are short-circuited, depending on the level of the operating voltage, and, when the operating voltage ($U_B$) drops, k LED units of the series connection are short-circuited taking a stored weighting with respect to the priority into consideration, wherein current continues to flow concurrently through (n–k) LED units.

It is expedient if k=0 is selected at a normal operating voltage and a normal operating state, and the series connection is fed a constant current.

In one recommendable variant, it is provided that the power source is activated for changing to a higher/lower value of the constant current if LED units are short-circuited. In this way, a temporary increase in current can be used to maintain an essentially undisrupted operation.

Another recommendable option for reducing the problems in the event of a drop in voltage is obtained when the current through the series connection is increased and/or at least one of the remaining LED units that are not permanently short-circuited is short-circuited in a cyclically rolling, continuously alternating manner, when the operating voltage drops.

Heating problems are advantageously taken into consideration, if the increase in current takes place as a function of a temperature that is significant for the LED units.

In a practical variant, the duration ($\tau$) of one sequence is thus selected between 1 μs and 50 ms, and preferably 5 ms.

In the spirit of traffic safety, it is particularly expedient if the area located closest to the HV point is given the highest priority/weighting.

A further increase in traffic safety can be achieved when the weighting takes place based on supplied signals related to the present driving situation, such as GPS signals, steering wheel signals or other signals of an on-board computer.

Likewise, the object is achieved by a circuit arrangement of the type described above, in which, according to the invention, a memory unit for storing information about weightings on the priority of certain LED units is assigned to the control unit, and the control unit is configured to compare the operating voltage and/or the current of the power source with predefinable threshold values and to activate the switching matrix as a function of this comparison and the weighting such that the LED units are interconnected when the operating voltage drops, taking a stored weighting with respect to the priority assigned to individual LED units into consideration.

In an easily implementable variant, it is provided that the circuit arrangement is composed of n controlled switches that each bypass the series-connected LED units, and that the control unit is configured to short-circuit k LED units of the series connection via the assigned switches as a function of the comparison and the weighting, wherein current continues to flow concurrently through (n–k) LED units.

The control unit is advantageously configured to carry out a weighting based on supplied signals related to the present driving situation, such as GPS signals, steering wheel signals or other signals of an on-board computer.

It is furthermore expedient if the control unit is configured to short-circuit k LED units of the series connection via the assigned switches in sequences and in a cyclically rolling, continuously alternating manner as a function of the comparison, wherein current continues to flow concurrently through (n–k) LED units.

A practical variant is characterized in that the duration of a sequence is between 1 μs and 50 ms, and preferably is 5 ms.

Furthermore, it is advantageous if the memory unit for storing is also assigned information about maximum currents and respective actual values of voltages and currents and weightings of certain LED units.

A supplementary compensation of the problems in the event of a drop in voltage can be achieved if the control unit is configured to increase the current through the series connection and/or to short-circuit at least one of the LED units in a cyclically rolling, continuously alternating manner when the operating voltage drops.

The invention, along with further advantages, will be described in greater detail hereafter based on exemplary embodiments, which are illustrated in the drawings. In the drawings.

Figure 1:
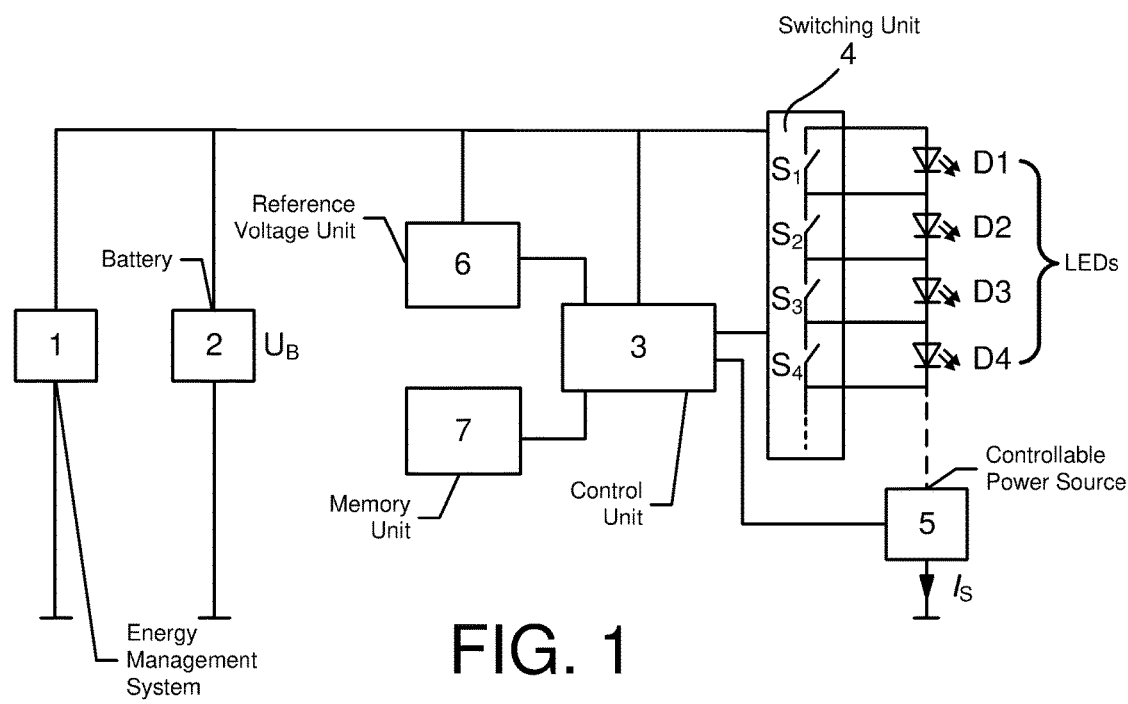
FIG. 1 shows a block diagram of a circuit arrangement according to the invention.

FIG. 1 shows a block diagram of a first embodiment of a circuit arrangement according to the invention using the example of the activation of four light-emitting diodes, hereafter referred to as LEDs. In this example, a vehicle battery 2 in a motor vehicle is maintained, to the extent possible, in a charged state having a target voltage of 12 volts with the aid of an energy management system 1, which is not shown in greater detail and comprises in particular a generator and a charge controller. The actual battery voltage is denoted by $U_B$, and is usually 13.5 to 15 volts during driving operation.

This voltage $U_B$ is to be used to feed four series-connected LED units LED1, LED2, LED3 and LED4, which in the simplest case are composed of individual LEDs and for the sake of simplification are also shown in this way; however, it should be clear that the LED units can also each comprise multiple LEDs, in particular when combined on a chip. A switching unit 4 activated by a control unit 3 is assigned to the LED units LED1, LED2, LED3 and LED4, wherein a controlled power source 5 is provided to supply the series connection with constant current. The switching unit 4 offers at least the option of selectively short-circuiting each of the four LED units using switches $S_1$ to $S_4$ for a certain period of time. The switches $S_1$ to $S_4$ are generally implemented by switching transistors. The control unit is supplied a reference voltage $U_{ref}$ made available by a reference voltage unit 6, and the control unit 3 is furthermore connected to a memory unit 7, in which information about maximum currents, respective actual values of voltages and currents, weightings of certain LED units with respect to the priorities, activation times and maximum temperatures, most recently activated switches and the like may be stored.

Figure 2:
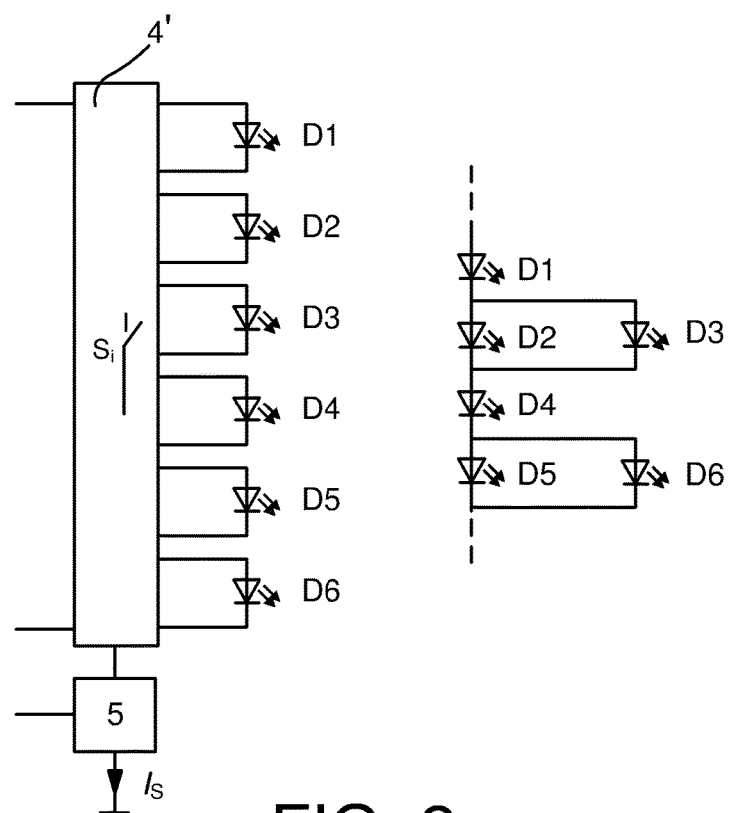
FIG. 2 shows the portion of a block diagram as FIG. 1, however for one variant with respect to the activation of the LEDs.

In the variant shown in FIG. 2, it is provided that a number of light-emitting diodes or LED units D1 to D6, six in the present example, are each conducted with the two terminals thereof to a switching matrix 4', which has a number of controlled switches $S_i$ that is such that the LEDs D1 to D6, in principle, can be arbitrarily connected in parallel or in series. This corresponds to the prior art, for example the above-mentioned WO 2010/013177 A1. On the right in FIG. 2, for example, the series connection D1-D2//D3-D4-D5// D6 interconnected for a particular operating mode is shown. As is described in greater detail hereafter, the switching matrix 4' is used to implement an emergency lighting function here.

Figure 3:
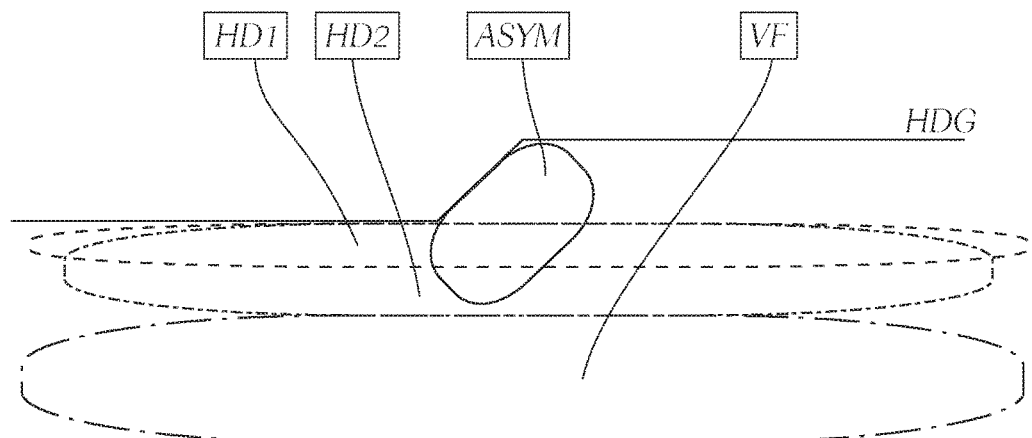
FIG. 3 shows an exemplary light distribution of an LED headlight unit.

FIG. 3 schematically shows the light distribution of a low-beam light, wherein this low-beam light is formed of multiple LED units. In the present case, there are four LED units HD1, HD2, ASYM and VF, wherein one forms the far field VF, two more form the horizontal light/dark boundary HD1 and HD2, and the fourth LED unit forms the asymmetry ASYM of the low-beam light. In the present case, the designations HD1, HD2, ASYM and VF are thus used both for LED units and for the respective field they illuminate. This corresponds to a typical LED low-beam light module used in practice, which is designed as a projection system comprising a multiple compartment reflector, wherein a respective LED unit is assigned to the compartments and overall they form a low-beam light.

This means that the number of partial light distributions is dependent on the design of the module, wherein, as mentioned above, one LED unit can also be composed of multiple LEDs that, when arbitrarily interconnected, can act as the LED unit within the meaning of the invention, so as to be able to create, in turn, a defined number of partial light distributions. It it should be noted that the interconnection of LEDs in certain embodiments results in a different forward voltage or overall voltage of the LED unit. The number of the individually switchable partial light distributions is thus dependent on the module on the one hand, and dependent on the interconnection on the other hand, but can be varied within a certain range.

In any case, the light pattern in today's LED modules is always formed of multiple LED units, which each form a partial light distribution, so that the generated light pattern of an LED headlight is always composed of multiple partial light distributions, of which certain partial light distributions are more important than others for visibility with respect to other road users. Accordingly, a certain weighting/prioritization can be assigned for the individual partial light distributions, which in the case of a certain undervoltage ensures that at least the visibility with respect to other road users is ensured.

In general, one can say that the area (the partial light distribution) situated the closest to the HV point (which is located 25 cm above the light/dark boundary in the center of the light beam; it is an important term in motor vehicle lighting technology, and it is the point in the light pattern at which the horizontal and vertical intersect, which is to say the 0°/0° point), and preferably even several degrees above the horizontal 0° line, must be given the highest priority/ weighting since this area corresponds to the area in which other road users are most likely present, or in this area the risk of encountering other road users is the greatest. Depending on the situation, it may also be advantageous to give higher priority to precisely those areas that seem important in the view of the driver, and thus do not serve the visibility with respect to other road users, but rather seem important for illuminating certain areas for the driver. For example, it is also possible to provide a weighting with respect to comfort, and specifically such that those areas in which the driver does not immediately notice that these have a darker appearance are given a lower weighting.

Alternatively, this function may cooperate with a GPS, steering wheel sensor, inclination sensor and the like, so as to adapt the area of the prioritization as a function of the road situation, for example so as to prioritize a negotiation of a curve of the LED unit that is configured to provide illumination in the direction of the curve, or at least to provide illumination toward the sides, since in such a situation the prioritization of the partial light distribution in the vicinity of the HV point would not be the best choice. In other words, the weighting is carried out taking the current driving situation into consideration here.

In the normal operating state, at a nominal operating voltage $U_B$, such as 12 volts, all four LEDs are connected in series (see FIG. 1) and powered by this voltage. In the control unit 3, the instantaneous operating voltage $U_B$ is continually compared to the reference voltage $U_{ref}$, and a decision is made based on the values stored in the memory as to whether an intervention due to undervoltage is to take place. During such an intervention, LED units can be periodically short-circuited in accordance with the method according to the invention, or a change in the current $I_S$ through the series connection can be initiated in that an appropriate signal is output by the control unit 3 to the controlled power source 5.

The method according to the invention, which can be implemented by way of a circuit arrangement according to the invention, shall now be described with reference to FIG. 4 in conjunction with FIG. 1. In the shown diagram, the time-dependent switching states of four LEDs LED1, LED2, LED3, LED4 are illustrated on top of one another, and more particularly for the operating case in which the operating voltage $U_B$ has dropped to such a value that one of the four LEDs at a time is temporarily switched off, and particularly is short-circuited by one of the switches $S_1$ to $S_4$ (FIG. 1). The letters E and A on the y axis denote "on" and "off," respectively, for the particular LEDs.

Figure 4:
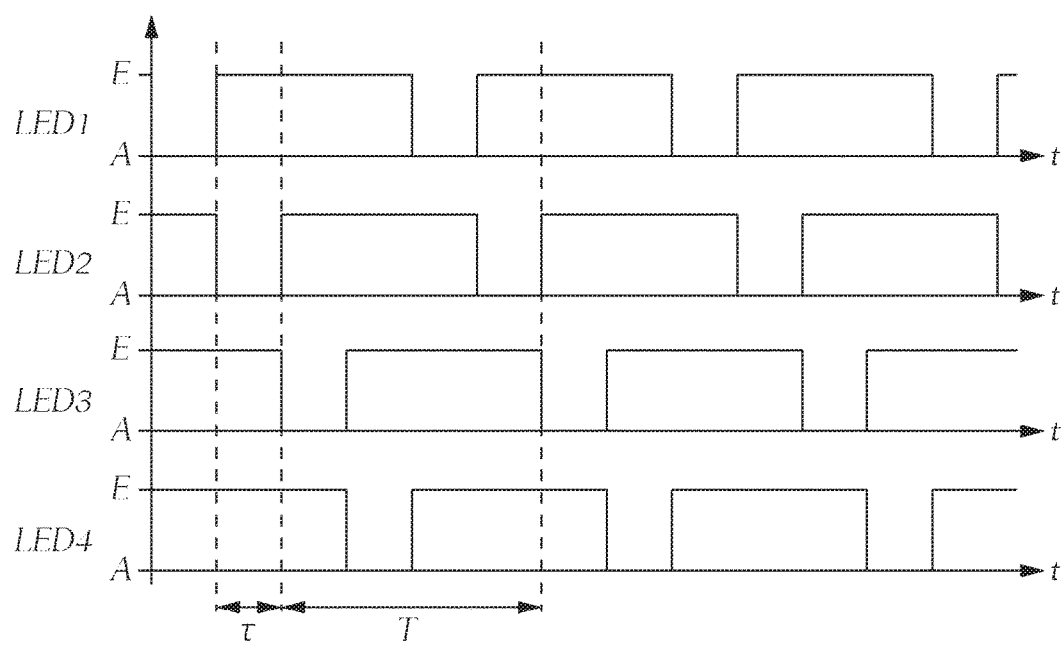
FIG. 4 shows a diagram relating to the chronological progression of the activation of four LEDs according to a first variant of a method according to the invention.

It is apparent from FIG. 4 that, on a cyclically rolling basis, one of the four LEDs of the series connection at a time is short-circuited, wherein at the same time current continues to flow through three LEDs. The short-circuiting is carried out for a such duration or clock pulse length $\tau$ that no unpleasant flickering is discernible to the human eye. In practice, for example, a clock pulse duration of $\tau=20$ ms may be selected, but in general clock pulse lengths of 1 µs to 50 ms may be useful. It is furthermore apparent from FIG. 4 that the entire switching process takes place cyclically at a period duration of $T=4\tau$.

The illustration according to FIG. 4 also clarifies that three of the four LEDs are switched on at any given point in time, and one LED is switched off (short-circuited). The lower operating voltage allows only three LEDs to be operated, instead of four LEDs (in the normal operating case), wherein one of the LEDs does not remain permanently dark, as is the case according to the prior art.

It shall already be mentioned at this point that, with an appropriate circuit design, the drop in brightness caused by the—periodic—outage of one LED can be at least partially compensated for by increasing the current through the series connection.

Furthermore, it shall be mentioned that frequently it will be desirable to ensure that the switching-on and switching-off edges are not too step, but to design these so as to be flatter, beyond the edge slope that is technically feasible, so as to avoid flicker effects and/or EMC disadvantages.

In connection with FIG. 4, a simple special case was addressed, which initially is intended to simplify the understanding of the invention. The general case, however, is furthermore that the series connection comprises n LED units, of which k LED units are short-circuited as a function of the level of the operating voltage, wherein at the same time current continues to flow through (n−k) LED units. In the case of FIG. 4, thus n=4 and k=1.

Figure 5:
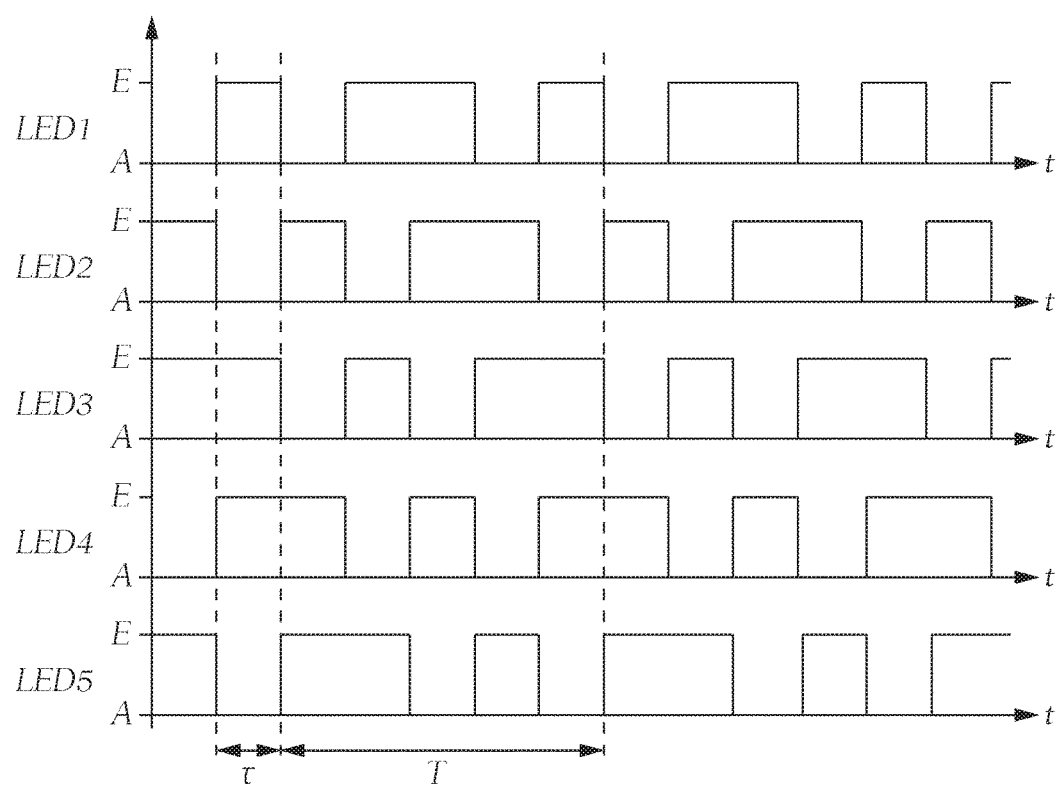
FIG. 5 shows a diagram relating to the chronological progression of the activation of five LEDs according to a second variant of the method according to the invention.

Based on this consideration, FIG. 5 shall now be addressed, which relates to a series connection of five LED units LED1, LED2, LED3, LED4 and LED5, and proceeding on the assumption that the supply voltage $U_B$ has dropped so far that two of the five LEDs at a time are short-circuited to ensure proper operation of the corresponding lighting device. Again, the clock pulse length $\tau$ is shown, however the period duration in keeping with the number five of the LED units is $T=5\tau$. Analogously to the case described based on FIG. 4, three of the five LEDs are switched on at any given time, and two LEDs are switched off (short-circuited). The lower operating voltage is only sufficient for three instead of five LEDs here (in the normal operating case), wherein one, or even more, of the LEDs do not remain permanently dark, as is the case according to the prior art. In the case of a series connection of five LED units, it is also possible, of course, to periodically switch off only one LED if the operating voltage $U_B$ has dropped only slightly.

At this point, it shall be noted that the number of LEDs or LED units, also in connection with the forward voltage thereof and the available operating voltage, in motor vehicles the on-board voltage can also be 24 volts or more.

Figure 6:
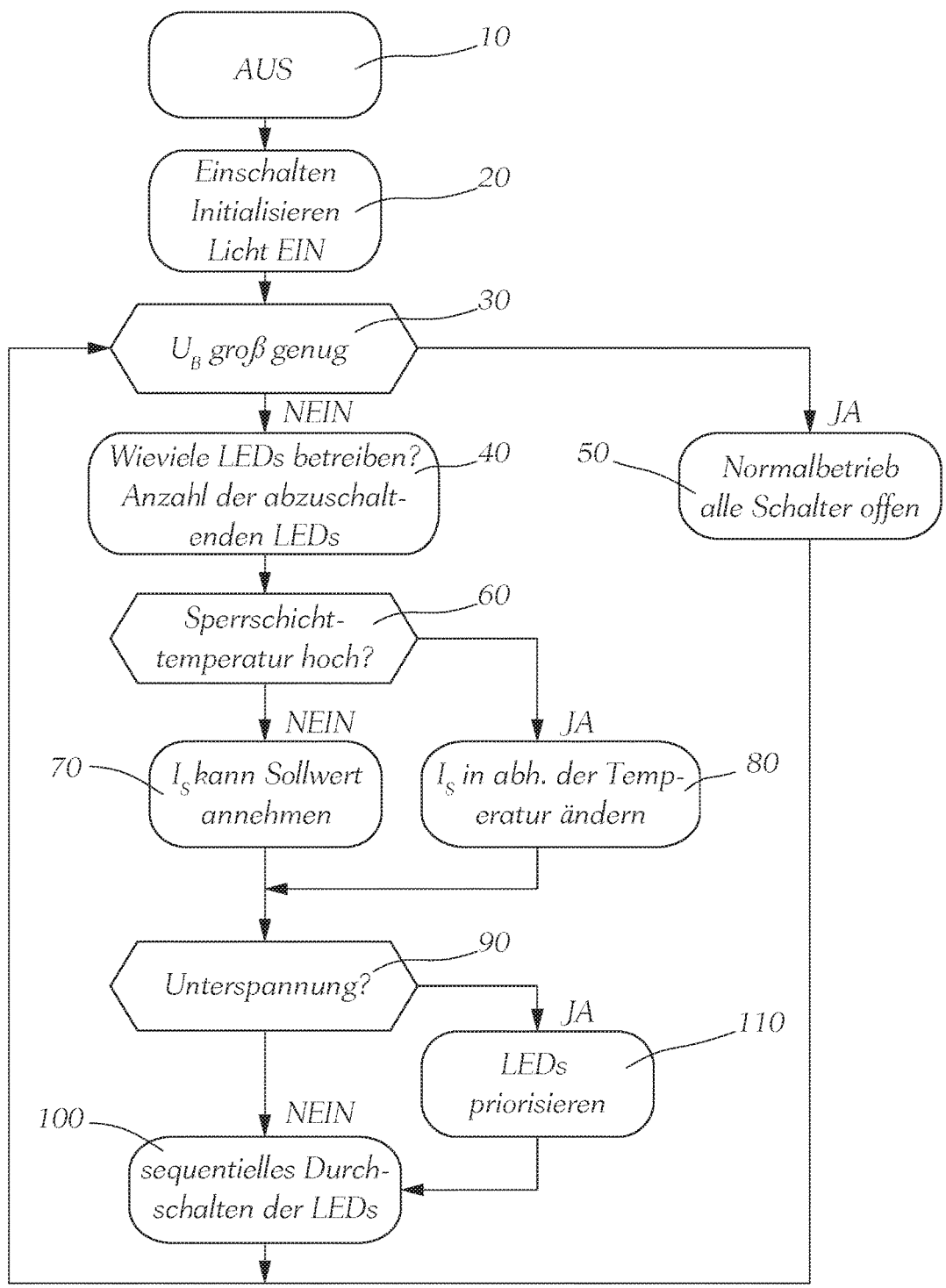
FIG. 6 shows a flow chart for one embodiment of a method according to the invention.

FIG. 6 shows a flow chart, by way of example, related to the method according to the invention, which, to the extent it is not self-explanatory, shall be described hereafter on a supplementary basis.

Starting from the switched-off state in step 10, the switching on is carried out in step 20 with the initialization of the control unit 3 in conjunction with the memory 7. In step 30, it is checked, by way of the reference voltage or a target/actual comparison of the current through the series connection, whether the operating voltage $U_B$ is high enough. If this is not the case, step 40 is carried out to check how many LED units must be deactivated. The corresponding number k is given by $k=n-(U_B/U_{LED}$, rounded).

Analogously to this number, a certain on-duration of each LED unit is obtained in the corresponding period. Comparable to pulse width modulation, a duty cycle for each LED unit of (n−k)/n is thus obtained. In the example of four LEDs: k=1 results in 75%, see FIG. 3, k=2 results in 50%, and so forth.

If it was found in step 30 that $U_B$ is high enough, or the actual current corresponds to the target value of the current (see explanation in the next paragraph), according to step 50 operation is normal, all switches, such as $S_1$ to $S_4$ in FIG. 1 are open, and the LED units are being operated continuously, which is to say not in a pulsed manner. Advantageously, it is also possible to provide a flow in which the number of LEDs to be operated is increased incrementally.

Control via threshold values of the voltage is possible, but may entail disadvantages in practice since the forward voltage of the LEDs fluctuates drastically (for reasons related to production), and is dependent on the current and the temperature. An expedient control provides for bypassing of the LEDs when the current drops. The power source strives to keep the current constant; if it does not manage to do so, for example due to undervoltage, the current drops. By measuring the current, for example via a shunt resistor, a deviation of the actual value from a target value (which is stored in the memory) can be carried out. Initially, one LED is to be short-circuited at a defined deviation, such as by −5% (to 95%). If it is possible to reach the target current, one LED is short-circuited in an alternating manner. If this is not the case, another LED must be short-circuited, and so forth.

So as to be able to switch back into normal operation via the current measurement, or to check, using the current measurement method, whether the operating voltage even allows a switch back into normal operation, it is possible to briefly operate all LEDs (for example in a 10 μs range, so that this switch is not discernible to the eye). During this time, the current is measured. If the measured current corresponds to the target current, which is to say the current that should flow during normal operation, and the value thereof is stored in memory 7, it is possible to transition into normal operation (all switches open).

In steps 60, 70, 80 (optional), it is checked to what extent the current can be increased. Depending on the type, LEDs can be operated at as much as double or even triple the current, but only for a short duration (10 to 100 ms), since otherwise the temperature thereof would rise drastically. The pulse length is dependent on the level of the current and the temperature and is specified by the LED manufacturers. However, to compensate for brightness fluctuations based on the reduced number of illuminated LED units, the current may be increased up to a certain value, depending on the temperature.

In other words, depending on the type and use of the LED unit, a maximum junction temperature must not be exceeded (by measuring the contact temperature and the ambient temperature and/or the power consumption, it is possible to calculate the junction temperature of the LED, or of the multiple LEDs of the LED unit, via the manufacturer's information about the thermal resistance between the barrier junction and the contact point). In general, a temperature will be measured there that is significant for the (junction) temperature of the LEDs, and optionally the ambient temperature can also be recorded.

If the junction temperature is below a certain value, $I_S$ may be increased accordingly so as to prevent a decrease in the overall brightness of the LED unit strand as a result of cycled consecutive short-circuiting. Accordingly, $I_S$ is set to n/(n−k) times the level. If one LED unit has to be switched off, for example due to a decrease in the operating voltage to 10 volts, then: 4/(4−1)=1.333 and $I_S$ can be increased to 133%. It shall be noted that an LED loses efficiency as the current rises, in other words does not exhibit a linear behavior. Consequently, the current would have to be set at a higher value in keeping with the manufacturer's information in order to achieve a corresponding increase in lighting. For example, the current would have to be increased by approximately 40% for a desired increase in light of 33%.

The change in the current can advantageously take place continuously over time, resulting in advantages both in terms of the technical dimensioning of the power source 5 and the EMC behavior.

If the junction temperature exceeds a certain value, $I_S$ may be increased, but only to a certain maximum value, at which it is ensured that an increase to this maximum value does not result in damage to the LED units. Naturally, it is possible to use multiple threshold values so as to achieve a preferably continuous compensation of brightness fluctuations.

In step 90 (optional), it is checked to what extent a drastic undervoltage is present, wherein the corresponding comparison value can be freely selected depending on the system. For example, an undervoltage could be defined as a voltage below 7 volts. During a drop in the operating voltage, for example to 6 volts, step 110 would follow accordingly. According to this step, a certain prioritization established in the memory 7 would take place. As described above, a kind of emergency lighting function can thus be implemented.

In contrast, the described cyclical operation of the LED units takes place at an operating voltage in the present example of more than 7 volts.

Depending on the design of the threshold value for an undervoltage, it is also possible, of course, in the example of four LED units to connect only three LED units in a cycled manner, namely the three having the highest weighting/priority. This enables an extremely variable usage range.

In step 90, the LED units are consecutively operated, wherein, accessing the memory, a memory function is used so as to prevent the same LED unit from being continually deactivated. Reference shall be made to the diagrams of FIGS. 4 and 5 for additional explanations.

Figure 7:
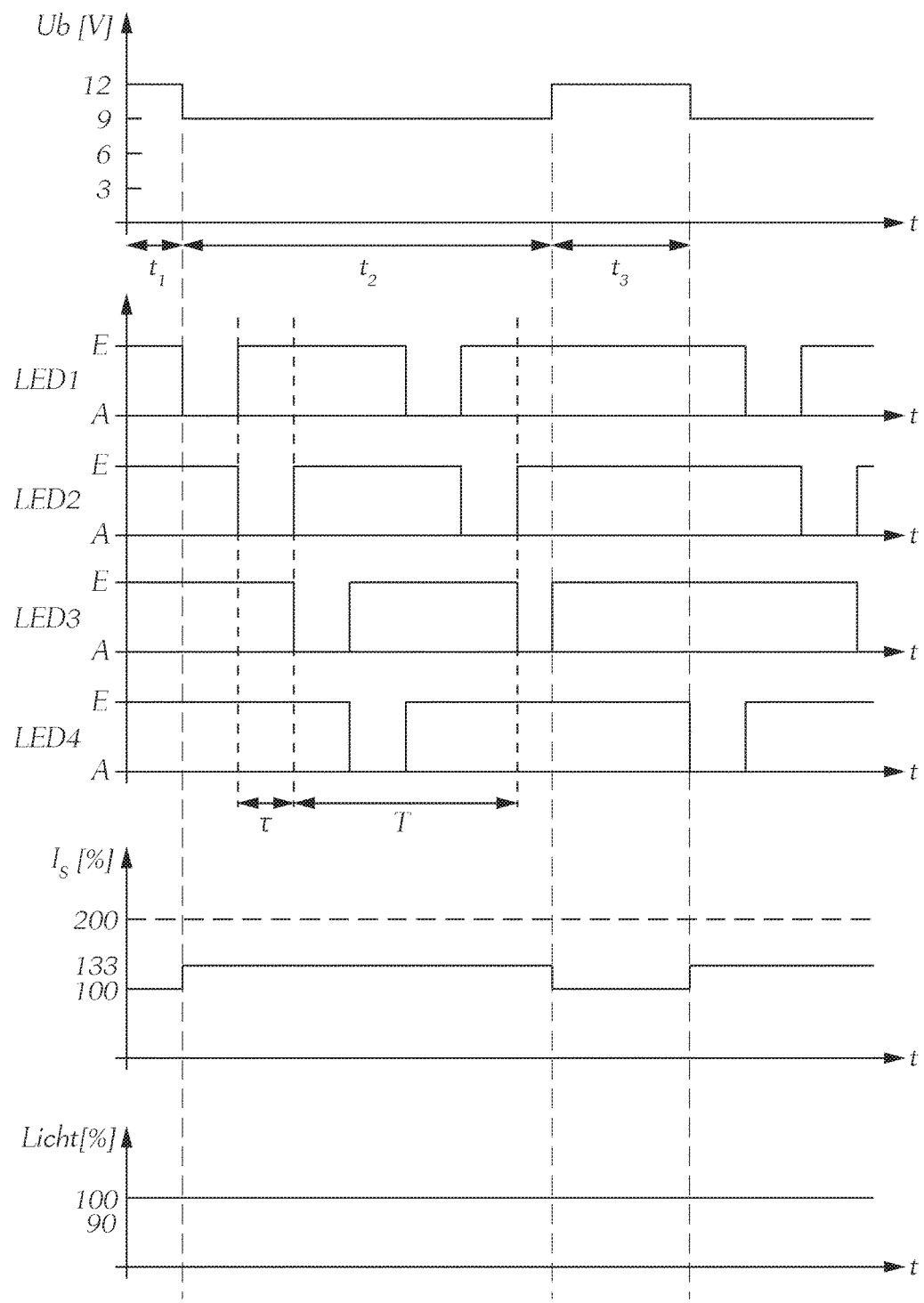
FIG. 7 shows, in four diagrams, the chronological progression of the activation of four LEDs with simultaneous compensation for brightness fluctuations via the current.

The memory function is also used to prevent a system-driven reset of the consecutive short-circuiting of the individual LED units after "normal operation," as is shown in FIG. 7. Alternatively, a random number generator could be used instead of a memory function, so as to prevent inhomogeneous utilization or aging of the LED units, for example in the event of continually recurring short fluctuations having equal durations. Short fluctuations refer to a voltage drop, as a result of which, for example, only up to three of, for example, four LED units at a time are alternately short-circuited. As was already noted, the individual LED units can be prioritized in the control unit 3 or the memory unit 7 assigned thereto, if need be. It is thus possible to establish that, starting at a certain drop in the supply voltage $U_B$, only a limited, but defined number of LED units is to be operated. A headlight module, for example, can comprise multiple groups of LED units, wherein each group is in charge of one illumination area. With reference to FIG. 3, for example when four groups are present, an assignment to the illumination areas HD1, HD2, ASYM and VF can be carried out. So as to be able to still ensure sufficient visibility with respect to other vehicles in the event of an undervoltage, advantageously the group responsible for illuminating ASYM, for example, is the one given the highest priority, which is to say the greatest weighting.

One weighting by way of example could be: ASYM-HD1-HD2-VF. If the control unit detects an undervoltage or a drop in current, initially the far field VF can be dimmed. In this regard, it shall furthermore be noted that, assuming a nominal operating voltage of $U_B$ =12 volts, for example, an LED can be operated normally even when the operating voltage drops to $U_B$ =4 volts by using the cyclically rolling operation or short-circuiting of other LEDs and/or by way of a higher weighting.

In the general case, an intervention on the power distribution of the individual LED units or LEDs can take place not only by cyclical switching, but also by activating the controlled power source, which is to be described hereafter with reference to FIG. 7.

The starting point is a nominal operating voltage $U_B$ =12 volts of four LEDs or LED units, which according to the first diagram at the top of FIG. 6 drops to 9 volts following a time period $t_1$, reaches the nominal value of 12 volts again after a time period $t_2$, and drops to 9 volts again after a further time period $t_3$. The illustrated chronological progression is simplified or idealized, of course, and is only provided for an explanation of the invention.

The second diagram from the top in FIG. 7 corresponds to that of FIG. 4 and shows the beginning of the cyclical operation or short-circuiting of one LED after an expiration of the time $t_1$. After the time $t_2$ has expired, a temporary transition to "normal operation" takes place, during which all LEDs are energized, and the cyclical short-circuiting of one LED starts again after expiration of the time $t_3$.

The third diagram from the top in FIG. 7 shows the intervention on the controlled power source for the purpose of changing the current $I_S$. During the time $t_1$, the current $I_S$ remains at the nominal value thereof, which is denoted by "100%" here. So as to retain the entire luminous flux of the LED system despite the cyclical switch-off of one LED, or so as to at least partially compensate for the same, the current $I_S$ can now be temporarily increased, which is to say during the time period $t_2$, which in the present case is to approximately 140% of the nominal current. After expiration of the time $t_2$, which is to say the return of the operating voltage $U_B$ to the nominal value thereof, the current $I_S$ is set back to the nominal value thereof of 100%, so as to be increased to 133% again after expiration of the time $t_3$. The result can be seen in the bottom diagram of FIG. 7 illustrating the luminous flux, which does not change despite the intermittent cyclical deactivation.

While a weighting is essential for the function of the emergency lighting system, cyclical operation (short-circuiting) of the individual LED units is not absolutely imperative. The problem, as is known from the prior art, is that proper illumination is directly dependent on the operating voltage, and in motor vehicles on the battery voltage. This problem exists when the operating voltage $U_b$, for example due to a defective car battery, drops below a certain value (definable), at which only one or, generally speaking, fewer than the total number of LED units can be operated. For example, this would already be the case at 10 volts if the forward voltage of the LED units (naturally, dependent on the interconnection, should an LED unit be composed of multiple LEDs) is approximately 3 volts, for example. In this case, approximately 12 volts would be required for the "normal operation." Certain voltage values that cause these to have levels precisely in the threshold range between switching off and not switching off an LED unit and can optionally be influenced by way of a controllable resistor. At the above-mentioned operating voltage $U_B$ of 10 volts, an LED unit can be short-circuited, so that, in the example, only a required voltage of approximately 3×3 volts=9 volts arises, and the remaining voltage of 1 volt is present on a series resistor or, as in the present example, a power source.

What is essential is that, due to the weighting, not just any arbitrary LED unit is short-circuited, but that having the lowest priority, which in the present or above-mentioned example would be the LED unit FV, which is to illuminate the far field.

Coming back to FIG. 2 again, it shall be described that, in the emergency lighting case, this function can be implemented not only by short-circuiting individual LED units, but also by an essential modification of the interconnection thereof. In the case of four LED units, for example, two LED units could be connected in series, with two more LED units being connected in parallel, whereby the required voltage is reduced by one quarter, wherein only half the current and an accordingly reduced luminous intensity result for the LED units connected in parallel.

In the example of FIG. 2 comprising six LED units, in the illustration on the right the LED units D1 and D4 are operated at full current, and the LED units D2, D3, D5 and D6, in principle, are each operated at half the current in a certain emergency lighting situation (in particular due to insufficient operating voltage). This also results in the option here of deciding which LED units are to be more important for the visibility with respect to other road users, and should thus be the very last having the luminous intensity thereof decreased. According to this example (to remain in the example of shown FIG. 2, right-hand side), D1 and D4 would have higher priorities than D2, D3, D5 and D6.

It is apparent that it is necessary, for the emergency lighting, to classify the LED units according to the priority thereof so as to deactivate, which is to say short-circuit, one unit having a low priority. Additionally, it is also possible to short-circuit the remaining, not permanently short-circuited LED units on a periodically rolling basis, and a change in the current $I_S$ by the controlled power source may also be employed.

The invention claimed is:

1. A method for feeding n LED units (LED1 to LED5) of at least one lighting unit of a motor vehicle for illuminating a roadway by way of a controlled power source (5) from a voltage source (2) having a fluctuating operating voltage ($U_B$), in which individual LED units of the n LED units are configured to be connected in series and/or in parallel and/or bypassed, depending on the level of the operating voltage, the method comprising:
   determining, based on drops in the operating voltage ($U_B$) and a stored weighting with respect to a priority assigned to the individual LED units, the interconnection of the n LED units (LED1 to LED5),
   wherein when the individual LED units illuminate individual areas of the roadway, the area located closest to a horizontal-vertical point is given the highest priority/weighting, and/or
   wherein the weighting occurs based on supplied signals related to a driving situation or other signals of an on-board computer.

2. The method of claim 1, wherein a series connection of the n LED units (LED1 to LED5) is fed, wherein at least one of the individual LED units is short-circuited, depending on the level of the operating voltage, and, when the operating voltage ($U_B$) drops, k LED units (LED1 to LED5) of the series connection are short-circuited taking into consideration the stored weighting with respect to the priority, wherein at the same time current continues to flow through the n−k LED units.

3. The method of claim 2, wherein k=0 is selected at a nominal operating voltage ($U_B$) and a normal operating state, and the series connection is fed a constant current ($I_S$).

4. The method of claim 1, wherein the power source (5) is activated for changing to a value of the constant current ($I_S$) if at least one of the individual LED units (LED1 to LED5) is short-circuited.

5. The method of claim 4, wherein the current through the series connection is increased and/or at least one of the individual LED units that is not permanently short-circuited is short-circuited in a cyclically rolling, continuously alternating manner when the operating voltage ($U_B$) drops.

6. The method of claim 4, wherein when an increase in current occurs, the increase in current is a function of a temperature that is significant for the LED units.

7. The method of claim 5, wherein the duration ($\tau$) of one clock pulse is selected between 1 µs and 50 ms.

8. The method of claim 7, wherein the duration ($\tau$) of one clock pulse is 5 ms.

9. A circuit arrangement for feeding n LED units (LED1 to LED5) by way of a controlled power source (5) from a voltage source (2) having a fluctuating operating voltage ($U_B$), the circuit arrangement comprising:
   a control unit (3) for activating the power source; and
   a switching matrix (4, 4') that is assigned to the n LED units and that comprises controlled switches ($S_i$, $S_1$ to $S_4$),
   wherein the control unit is configured to connect individual LED units of the n LED units in series and/or in parallel and/or to bypass at least one of the individual LED unit, depending on the level of the operating voltage, wherein a memory unit (7) for storing information about weightings on the priority of certain LED units is assigned to the control unit (3), and the control unit (3) is configured to compare the operating voltage ($U_B$) and/or the current ($I_S$) of the power source with predefinable threshold values and to activate the switching matrix as a function of this comparison and the weighting such that interconnection of the n LED units (LED1 to LED5) is determined based on drops in the operating voltage ($U_B$), taking into consideration a stored weighting with respect to the priority assigned to individual LED units, wherein when the individual LED units illuminate individual areas of a roadway, the area located closest to a horizontal-vertical point is given the highest priority/weighting, and/or wherein the weighting occurs based on supplied signals related to a driving situation or other signals of an on-board computer.

10. The circuit arrangement of claim 9, wherein the switching matrix comprises n controlled switches ($S_1$ to $S_4$) that are each configured to bypass the series-connected LED units (LED1 to LED4, LED5), and wherein the control unit (3) is configured to short-circuit k LED units of the series connection via the assigned switches as a function of the comparison and the weighting, wherein at the same time current continues to flow through (n–k) LED units.

11. The circuit arrangement of claim 9, wherein the control unit is configured to short-circuit k LED units of the series connection via the controlled switches in a clocked and a cyclically rolling, continuously alternating manner as a function of the comparison, wherein at the same time current continues to flow through (n–k) LED units.

12. The circuit arrangement of claim 11, wherein the duration of one clock pulse is between 1 μs and 50 ms.

13. The circuit arrangement of claim 9, wherein the memory unit (7) for storing includes information about maximum currents and actual values of voltages and currents and weightings of at least one of the individual LED units.

14. The circuit arrangement of claim 9, wherein the control unit (3) is configured to increase the current through the series connection and/or to short-circuit at least one of the individual LED units in a cyclically rolling, continuously alternating manner when the operating voltage drops ($U_B$).

15. A method for feeding n LED units (LED1 to LED5) of least one lighting unit of a motor vehicle by way of a controlled power source (5) from a voltage source (2) having a fluctuating operating voltage ($U_B$), in which individual LED units of the n LED units are configured to be connected in series and/or in parallel and/or bypassed, depending on the level of the operating voltage, the method comprising:

determining, based on drops of the operating voltage ($U_B$) and a stored weighting with respect to a priority assigned to the individual LED units, the interconnection of the n LED units (LED1 to LED5), wherein the weighting occurs based on supplied signals related to a driving situation or other signals of an on-board computer.

* * * * *